United States Patent [19]

Niederöst et al.

[11] 4,074,341
[45] Feb. 14, 1978

[54] INTERLOCKED SEPARABLE FIRE SENSOR CONSTRUCTION

[75] Inventors: Werner Niederöst, Schmerikon; Bernhard Durrer, Stafa, both of Switzerland

[73] Assignee: Cerberus AG, Mannedorf, Switzerland

[21] Appl. No.: 689,375

[22] Filed: May 24, 1976

Related U.S. Application Data

[63] Continuation of Ser. No. 528,169, Nov. 29, 1974, abandoned.

[30] Foreign Application Priority Data

Dec. 7, 1973 Switzerland ............... 17219/73

[51] Int. Cl.² ........................................ H02B 9/00
[52] U.S. Cl. ........................... 361/331; 340/273 S; 339/91 R; 361/380
[58] Field of Search .................. 250/384, 385; 340/227 R, 237 S; 324/156; 335/167, 168, 170; 339/DIG. 2, 12 R, 88 R, 75 P, 91 R; 361/380, 331, 392

[56] References Cited

U.S. PATENT DOCUMENTS

| 3,500,291 | 3/1970 | Hubbell | 339/91 R |
| 3,767,917 | 10/1973 | Lampart | 340/273 S |

*Primary Examiner*—Gerald P. Tolin
*Attorney, Agent, or Firm*—Flynn & Frishauf

[57] ABSTRACT

To permit separation of a fire sensor element from a socket element, but prevent accidental, or unauthorized removal and separation, the socket element is formed with a movable catch engaging in an opening or recess in the sensor element, upon moving the sensor in engaged position with respect to the socket. The catch can be released from engaged position only by a removal tool pressing the catch out of engagement, the removal tool preferably being so constructed that it surrounds the sensor element to inhibit contact of the person handling the removal tool with the sensor element, and thus prevent contamination of the sensor element, or injury to the operator if the sensor element contains dangerous materials.

12 Claims, 4 Drawing Figures

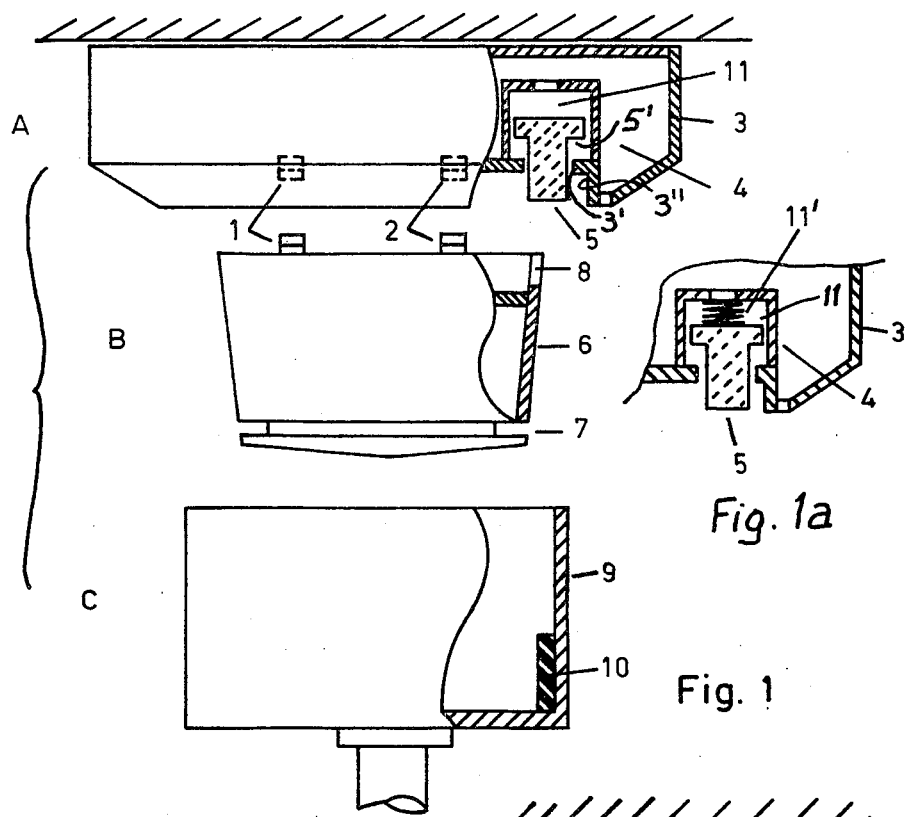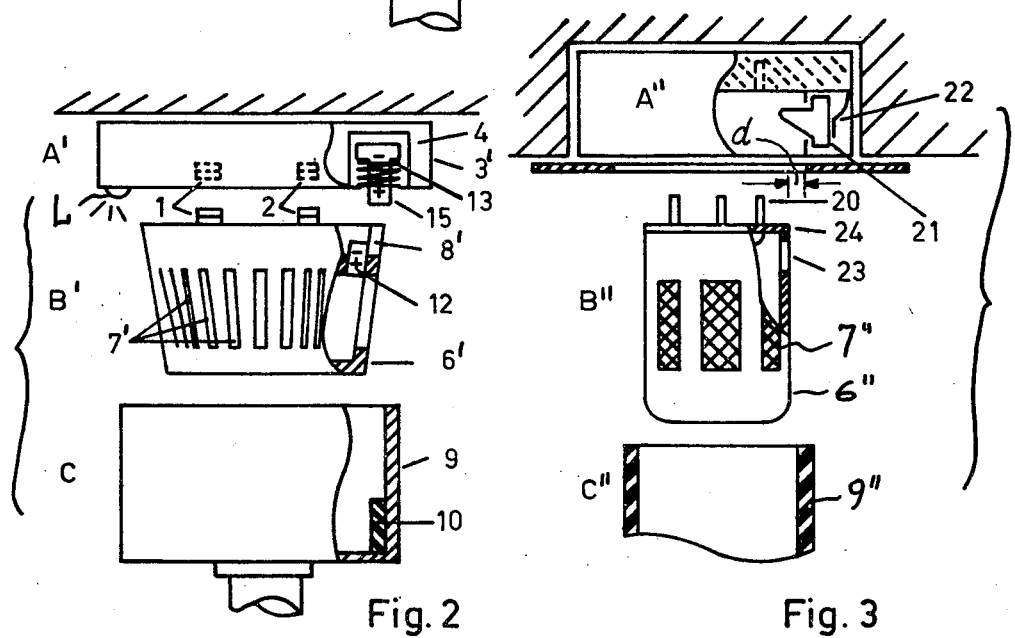

INTERLOCKED SEPARABLE FIRE SENSOR CONSTRUCTION

This is a continuation of application Ser. No. 528,169, filed Nov. 29, 1974, now abandoned.

Cross reference to related patent and applications:

U.S. Pat. No. 3,767,917

U.S. Ser. No. 374,310, now U.S. Pat. No. 3,909,813

U.S. Ser. No. 457,841, now U.S. Pat. No. 3,908,957 all assigned to the assignee of the present invention.

The present invention relates to fire-sensing devices, and more particularly to fire sensors which are adapted for connection to a socket, and to be removable from the socket.

Fire sensore are arranged to sense ambient conditions indicative of a fire, and include a sensing element which provides an electrical output signal so that an electrical circuit can provide a fire alarm, upon sensing of fire conditions. The sensing elements frequently require connection to electrical circuit elements which have very high resistances. Typical fire sensors may include ionization chambers or photoelectric cells. The evaluation circuits connected to such sensors include amplifiers which also may have high input resistances, such as highly sensitive field effect transistors. The fire sensor or detector requires insulation paths which are of extremely high resistance, and which should be as free from creep paths as possible.

Fire-sensing elements can be manufactured to have extremely high insulation resistances; they must be protected from casual or intentional contact, however. Fire sensors preferably are made in various parts, including one socket element, for example adapted for attachment to, or recessing into a wall or coiling of the space to be supervised, and a sensing element or fire detector portion itself which is removably connected to the socket. The various electrical connections and components of the detector or sensing portion become accessible upon removal of the detector portion from the socket; the sensitive sensing or detector elements may therefore be damaged, for example by mishandling.

Ionization-type fire sensors or detectors use radioactive substances. If the detector or sensing unit is removed from the socket, contamination by radioactive substances cannot be entirely excluded, which may result in hazards to the health of the persons handling the ionization-type detector.

It is an object of the present invention to prevent unauthorized separation of the fire sensor or detector portion or unit from the associated socket by unauthorized persons, and preferably by persons not having access to specific removal tools. Such tools should be simple, and removal of the sensor unit or element from the socket should still be simple, without requiring direct handling of the sensing unit or element itself. The use of safety screws or special holding screws to secure the sensing unit to the socket thus is not suitable.

Subject matter of the present invention

Briefly, a movable locking catch is provided, preferably located on the socket, which is so arranged that it snaps into a recess, aperture, or opening in the sensing unit or detector element itself upon engagement movement of the sensor unit or element with the socket, while preventing movement thereof in the opposite direction, that is, in a direction towards removal. The locking element or catch is so arranged that, when locked, it is not readily accessible, but rather is visually and operationally shielded by the housing structure of the sensor, for example of the socket itself. The sensor unit and the housing are thus telescopically connected. Only a shielded gap is left between the sensor unit and the socket. In accordance with a feature of the invention, a removal tool is provided which can engage in the gap between the socket portion and the sensor or detector portion and press the catch outwardly, while at the same time surrounding and shielding the detector portion, to permit removal of the detector portion from the socket while simultaneously protecting the sensor element or detector portion and not requiring handling thereof directly, during removal operation.

The invention will be described by way of example with reference to the accompanying drawings, wherein:

FIG. 1 illustrates, in exploded view, a fire sensor socket, detector, and removal tool combination FIG. 1a is a fragmentary detailed view of a modification of the catch element assembly of FIG. 1;

FIG. 2 is an exploded view of another embodiment of a fire sensor, and a removal tool, combination and to a reduced scale; and FIG. 3 is an exploded side view, partly in section, of another type of fire sensor, and removal tool combination.

The fire sensor construction illustrated in FIG. 1 shows the various elements. A socket portion or socket element A is secured to a support surface, for example the ceiling of a room or other space which is to be supervised for fire detection purposes. The actual sensor or detector element B is attached to the socket element A by means of interlocking bayonet fasteners 1, 2 which permit connection of element B with element A upon relative rotation of the two elements, in this case rotation of element B with respect to element A, secured to the ceiling. The detector element B may be any type of known fire detector, such as an ionization-type fire sensor, a smoke detector, a flame detector, or the like, or may contain other sensing elements which are sensitive to the consequences of a fire.

Socket portion or socket element A includes a housing 3 which has a depending projecting wall portion 3''. The housing 3 is formed with a space 4 in which a plug 5 is movable. Plug 5 can slide in vertical direction. Plug 5, preferably, is T-shaped in cross section, round or polygonal in plan outline, and formed with a cross element 5'. The element 5 normally lies with its cross piece 5' against the bottom wall of housing 3, being held there by its own weight.

The detector element B has a housing 6, preferably slightly conical, which includes the sensing elements responding to the consequences of a fire, as well as the electronic evaluation circuitry. The housing 6 is formed with an opening 7, through which air and smoke gases may enter into the interior of the housing 6. The upper edge of the housing 6 is formed with a slit-like aperture 8, which is dimensioned that the lower portion of the plug 5 fits into the slit. The slit is so located with respect to the bayonet fastener parts that, when elements A and B are assembled together, slit 8 is exactly beneath the plug 5.

Assembly: Upon pushing the detector or sensor element B against socket A, the upper edge of the housing 6 fits telescopically within the depending wall portion 3'', and will press plug 5 into the recessed space 11 thereabove. Upon subsequent rotation of the element B, to engage the bayonet fastener or catch, plug 5 will, when the bayonet fastener and catches are fully engaged, drop into the slitlike opening 8, located directly beneath plug 5. Plug 5, after having dropped into the slit-like opening 8, prevents reverse rotation of the sensor element B, so that removel of the sensor element from the socket becomes impossible. Electrical connections between the socket element A and the sensor element B have been omitted; they may be formed, for example, by spring contacts, pigtail wires and separable connectors, and the like for example as shown in cross-referenced U.S. Pat. No. 3,767,917 illustrates spring contacts engaging contact surfaces.

Disassembly: By use of the key and tool combination shown as element C in FIG. 1, sensor element B can be unlocked from socket A and then removed from the socket element A. The removel key and tool combination forming element C comprises a sleeve 9 which can be pushed over the element B. . The plug 5 is so arranged that its width projects laterally over the edge of the slit 8, so that the upper edge of the sleeve 9 of the removal tool will engage against the lower edge of plug 5, thus pushing plug 5 upwardly. Alternatively, the clearance, schematically indicated at 3', between plug 5 and the internally projecting shoulder can permit engagement of the upper edge of the sleeve 9 with the cross element 5' of plug 5, pushing plug 5 upwardly and releasing plug 5 from the slit 8. The sleeve 9 of the removal key and tool fits into the gap between the housing 6 of the sensor and the projecting wall portion 3" of the socket housing 3; or, into the very narrow gap 3'. The plug 5 is thus shielded and inaccessible unless engaged for unlocking by the combined removal key and tool. The inside of sleeve 9 has a rubber or foam or similar insert 10 at the lower edge thereof, which resiliently clamps the sensor element B so that, upon subsequent rotation of the unlocking key removal tool combination C, the sensor element B is carried along, and rotated, thereby disengaging the bayonet catches 1, 2. The sleeve 9 is attached to a handle which, for example, may be a long rod, only the upper portion of which is shown, so that the detector or sensor element B can be removed by service personnel without resorting to ladders or the like. It is then merely necessary to push the removal tool element C against the socket element B, and twist. The socket element, upon removal, will be retained by the resilient holder 10 within the cup-shaped removal tool element C, so that the sensitive element B need not be handled or touched.

The invention is not limited to interlocking or interengaging catch elements operating by their own weight. For example, and referring to FIG. 1a, plug 5 can be pressed downwardly by a spring 11' located within the space 11. A spiral spring is suitable. Positive engagement of the plug 5 with the slit-like aperture 8 of the sensor element B is ensured.

The fire sensor and removal tool of FIG. 2, as shown, has a catch or lock which is magnetically retained. Socket 3' is formed with an auxiliary chamber in which a plug 15' is located, made of magnetic material, the poles of which are schematically indicated by + and − signs. Plug 15' is a permanent magnet, being pressed upwardly by a spiral spring 13. A light L is located on the socket element A', adapted to be illuminated when the sensor responds. The sensor element B' is slightly conical; its housing 6' is formed with lateral air entrance slits 7'. A magnetically responsive element 12 is located on the detector element B'; this magnetically responsive element may be a permanent magnet, polarized as shown, or a soft-iron plug, and located close to the slit 8'. If a permanent magnet, the location of polarization is opposite that of the plug 15, so that opposite poles will be facing each other.

For assembly, and upon rotary engagement of the bayonet catches 1, 2 of element B' and A', permanent magnet plug 15 is attracted by the opposite pole of the plug 12 (or by a soft-iron plug in the detector element B'), thus positively ensuring seating of the magnetic plug 15 within the slit 8, and preventing subsequent rotation of the detector element B, and thus removal from the socket element A. The removal tool element C may be similar to that of the tool of FIG. 1. The plug 15 is pressed upwardly by the upper edge of sleeve 9 of the tool, releasing the magnetic attraction, and permitting rotation of the sensor element B' upon engagement with the resilient insert 10 in the removal tool.

Embodiment of FIG. 3: The sensor element B" is formed with connecting plugs 20, adapted to engage in matching sockets in the socket element A". Socket element A" is of the recessed type, to be mounted flush with a ceiling structure, for example. The lock is a wedge-shaped plug 21, having a downwardly inclined surface, and pressed into projected position by means of a resilient element, such as a leaf-spring 22, a spiral spring, foam padding, or the like. The sensor element B" has an essentially cylindrical housing 6", in which grid-like openings 7" are provided to permit ingress of air and gases.

Assembly: The upper edge 24 of the detector element B", upon vertical movement of element B", engages the wedge-shaped surface of the plug 21, and presses the plug 21 radially outwardly. As soon as detector element B" is completely seated, the locking plug 21 snaps into the opening 23 formed in the housing 6" of the sensor element B", so that the sensor element B" can no longer be removed downwardly. The narrow gap left between the housing edge and the sensor housing 6" when the sensor is assembled in the socket is shown at d.

Removal: A removal tool which merely may include a sleeve 9" is used, the sleeve fitting over the housing 6" of the sensor element B", and engaging the slanting surface of plug 21, pressing the plug 21 outwardly and holding it in outwardly pressed direction, permitting removal of the sensor element B" downwardly. The diameter of the sleeve 9" of the removal tool C" may be just slightly greater than that of the sensor B". The sleeve 9" may, additionally, be formed with a resilient, inwardly extending bulge, punch, or the like, or be slit longitudinally to provide an inwardly extending springy region, for engagement of the sleeve 9" with the element B" in removing direction. Alternatively, a yielding resilient edge may be secured to the upper end of the sleeve 9", for example formed of plastic material, and integral with the sleeve 9" which, likewise, may be of plastic.

The direction of movement of the locking element, or locking catch 5 (FIG. 1), 15 (FIG. 2), 21 (FIG. 3) is at right angles to the direction of movement of the sensor element, when the sensor, or detector element and the socket element are being engaged. This difference in direction of movement provide for reliable locking engagement of the parts with respect to each other. Locating the locking catch or plug in such a manner that is is shielded, or shrouded by the housing of the socket itself prevents unauthorized removal and, ordinarily, removal without use of a tool adapted for the specific purpose.

Various changes and modifications may be made, and embodiments described in connection with any one of the drawings may be used with any one of the others, within the inventive concept. Preferably, the direction of motion of the safety catch is to be so selected that it differs from the direction of motion required to assemble (or disassemble) the socket and sensor elements.

We claim:

1. Interlocked, separable fire sensor construction having a socket element (A) adapted for mounting on a support including an outer socket housing (3), and a sensor element (B) including a sensor housing (6) and fire sensing and detection means located therein, removably secured to the socket element, wherein the socket housing (3) is formed with a projecting portion (3″);

the sensor housing (6) fits telescopically within at least a portion of the projecting portion (3″) of the socket housing (3) while leaving a narrow gap between said housings; and movable sensor element — socket housing interlock means (5, 15, 21; 8, 8′, 23) are provided comprising locking means (5, 15, 21) located on one of said elements (A) and matching engagement recess means (8, 8′, 23) formed on the other of said elements (B), said interlock means being located interiorly of the respective housing behind, and shielded by said projecting socket housing portion (3″) and, upon locking engagement of said elements, being accessible only through said narrow gap and being manually inaccessible, the locking means engaging in said recess means upon relative engaging movement of said elements and preventing disengaging movement of said elements upon engagement of said movable locking means in said recess means.

2. Sensor according to claim 1, wherein the locking means (5, 15, 21) are located on the socket element (A) and the recess means (8, 8′, 23) are located on the sensor element.

3. Sensor according to claim 1, wherein the movement of said locking means (5, 15, 21), upon engagement with said recess means (8, 8′, 23), is in a direction approximately at rights angles to the direction of relative movement of said elements upon engagement with each other.

4. Sensor according to claim 1, wherein the socket element (A) is formed with a downwardly facing opening, and wherein the locking means comprises a plug means (5, 15) extending through said opening to engage in the recess means of the sensor element.

5. Sensor according to claim 1, wherein the sensor element (B) has a sleeve-shaped housing (6), and the recess means comprises a slit-shaped gap (8, 8′) in the upper edge of the housing, the locking means (5, 15) being located on the socket element and engaging in the slit-shaped gap;

and wherein the relative engaging movement of said elements is in a sliding direction aligning said gap with said locking means.

6. Sensor according to claim 5, wherein the socket element (A) and the sensor element (B) include bayonet-type engagement means, and the locking means comprises a plug means (5, 15) located in alignment with said slit-shaped gap (8, 8′) when the elements (A, B) are engaged.

7. Sensor according to claim 5, wherein the locking means comprises a plug means (5, 15), said plug means being positioned on the socket element with respect to the sleeve-shaped housing (6) of the sensor element (B) when engaged with the socket element (A) so that a portion thereof extends laterally beyond the outer surface of the sleeve-shaped housing to permit engagement of said portion only through said gap.

8. Sensor according to claim 1, wherein the locking means comprises a vertically movable plug means engageable, by vertical sliding movement under the force of its own weight, with said engagement recess means.

9. Sensor according to claim 1, wherein the movable locking means comprises an engagement catch, located to engage the matching engagement recess means; and spring means (11′, 22) are provided engaging said catch and urging said catch in locking direction.

10. Sensor according to claim 1, wherein said movable locking means comprises magnetically active material, and magnetically responsive material is located adjacent said engagement recess means, said locking means, engaging in said recess means, and being maintained in said recess means by magnetic force.

11. Sensor according to claim 1, wherein (FIG. 3) the socket element (A″) and the sensor element (B″) are connected, when joined together, by means of plug-and-socket means (20), the direction of engaging movement being in line with the plug means;

and wherein said locking means comprises a locking catch (21) movable in a direction other than the direction of said plug means, the movable catch being spring-biassed to move in engagement with said recess means and engage therein upon engagement of said plug means in said socket means.

12. Sensor according to claim 11, wherein the catch (21) is wedge-shaped, having a slanting surface engaged by the sensor element (B) upon engaging movement with respect to said socket element (A), the slanting surface forming a camming surface and moving the catch (21), against its bias force, until engagement of the sensor element in said socket element, the recess means (23) being formed in said sensor elements (13″) and permitting return of said catch, and engagement in said recess means upon such engagement of said elements (A″, B″).

* * * * *